(12) United States Patent
Kao

(10) Patent No.: US 8,783,294 B2
(45) Date of Patent: Jul. 22, 2014

(54) EXHAUST MACHINE

(75) Inventor: Ching-Kuo Kao, New Taipei (TW)

(73) Assignee: Inotera Memories, Inc., Hwa-Ya Technology Park Kueishan, Taoyuan (TW)

( * ) Notice: Subject to any disclaimer, the term of this patent is extended or adjusted under 35 U.S.C. 154(b) by 430 days.

(21) Appl. No.: 13/241,281

(22) Filed: Sep. 23, 2011

(65) Prior Publication Data

US 2013/0037143 A1 Feb. 14, 2013

(30) Foreign Application Priority Data

Aug. 8, 2011 (TW) ............................. 100128213 A

(51) Int. Cl.
*F16K 11/085* (2006.01)
*C23C 16/44* (2006.01)

(52) U.S. Cl.
USPC .................. 137/874; 137/625.11; 137/625.16

(58) Field of Classification Search
CPC ................................................ C23C 16/4412
USPC .............. 137/874, 876, 883, 625.11, 625.15, 137/625.16, 565.23; 251/310
See application file for complete search history.

(56) References Cited

U.S. PATENT DOCUMENTS

| | | | | |
|---|---|---|---|---|
| 1,579,296 A | * | 4/1926 | Francois | 91/187 |
| 2,447,423 A | * | 8/1948 | Nies | 137/625.11 |
| 2,641,280 A | * | 6/1953 | Fleischhauer | 137/625 |
| 3,650,295 A | * | 3/1972 | Smith | 137/614.17 |
| 3,874,413 A | * | 4/1975 | Valdez | 137/625.47 |
| 4,553,566 A | * | 11/1985 | Barclay et al. | 137/625.11 |
| 5,343,893 A | * | 9/1994 | Hogan et al. | 137/624.13 |
| 5,517,800 A | * | 5/1996 | Brenner | 53/473 |
| 5,820,133 A | * | 10/1998 | Altshuler | 277/630 |
| 6,158,226 A | * | 12/2000 | Noji et al. | 62/55.5 |
| 6,490,740 B1 | * | 12/2002 | Gardenier et al. | 4/541.1 |
| 6,553,811 B2 | | 4/2003 | Nomura | |

FOREIGN PATENT DOCUMENTS

| | | |
|---|---|---|
| TW | 478959 | 3/2002 |
| TW | 201023262 | 6/2010 |
| TW | i326330 | 6/2010 |
| WO | 2005038255 | 4/2005 |

* cited by examiner

*Primary Examiner* — John Fox
(74) *Attorney, Agent, or Firm* — Winston Hsu; Scott Margo

(57) ABSTRACT

The present invention provides an exhaust machine which includes a first exhaust tube, a second exhaust tube, a first closed box, a second closed box, a pipe and a motor. The first exhaust tube is connected to the first closed box and the second exhaust tube is connected to the second closed box. The pipe penetrates the first closed box and the second closed box and connects to an exhaust gas source. The pipe includes a first inner opening and a second inner opening. The motor connects to the pipe and drives the pipe to make the exhaust gas pass into the first closed box through the first inner opening or into the second closed box through the second inner opening.

9 Claims, 5 Drawing Sheets

EXHAUST MACHINE

BACKGROUND OF THE INVENTION

1. Field of the Invention

The present invention relates generally to an exhaust device, and more specifically, to an exhaust device capable of emitting different gases to different exhaust pipes.

2. Description of the Prior Art

A vacuum exhaust device is widely used in various semiconductor equipments in order to remove the exhaust gas produced during the semiconductor process. In general, semiconductor equipment may produce different kinds of exhaust, wherein some of them must be treated or recycled respectively. Therefore, an exhaust machine capable of diverging and emitting the different exhausts to different exhaust pipes is necessary.

Please refer to FIG. 1 which illustrates a schematic view of a conventional exhaust machine. The conventional exhaust machine 100 includes a first enclosed chamber 102, a second enclosed chamber 104, and a third enclosed chamber 106. The first enclosed chamber 102 is connected to an exhaust source 126. An opening 118 is formed between the first enclosed chamber 102 and the third enclosed chamber 106. The second enclosed chamber 104 is connected to a first exhaust tube 108, while the third enclosed chamber 106 is connected to a second exhaust pipe 110 and a third exhaust pipe 112. The first enclosed chamber 102 is provided with a rotary valve 114 to selectively close one of the opening 118 and the opening 120. The third enclosed chamber 106 is provided with a rotary valve 116 to selectively close one of the second exhaust pipe 110 and the third exhaust pipe 112. The rotary valves 114 and 116 may block selected openings and exhaust pipes such that the exhaust may be extracted to a corresponding exhaust pipe.

Though the conventional exhaust machine 100 may selectively emit different exhausts to different exhaust pipes, the rotary valves 114 and 116 are vulnerable to the wearing of repeating rotation due to their ill-designed structure.

SUMMARY OF THE INVENTION

The present invention, therefore, provides an exhaust machine capable of diverging and emitting different exhausts to different exhaust pipes and has the advantages of smaller volume and being less prone to malfunctioning.

According to one embodiment, the present invention provides an exhaust machine comprising a first exhaust pipe connected to a first enclosed chamber, a second exhaust pipe connected to a second enclosed chamber, and a extraction tube penetrating through the first enclosed chamber and the second enclosed chamber and connecting to an exhaust source, wherein the extraction tube is provided with a first inner opening and a second inner opening. A pump is connected to the extraction tube and may drive the extraction tube to rotate around such that the exhaust produced from the exhaust source may enter the first enclosed chamber via the first opening or enter the second enclosed chamber via the second opening.

The exhaust machine disclosed in the present invention is provided with a particular extraction tube and the openings formed thereon to diverge and emit the different exhausts to different exhaust pipes via pumping. Therefore, the exhaust machine provided by present invention is smaller in size and less prone to malfunctioning.

These and other objectives of the present invention will no doubt become obvious to those of ordinary skill in the art after reading the following detailed description of the preferred embodiment that is illustrated in the various figures and drawings.

DETAILED DESCRIPTION

In order to provide a better understanding of the present invention to those of ordinarily skilled in the art, several preferred embodiments are enumerated with reference to the accompanying drawings, to explain the construction and the desired efficacy of the present invention.

Figure 1:
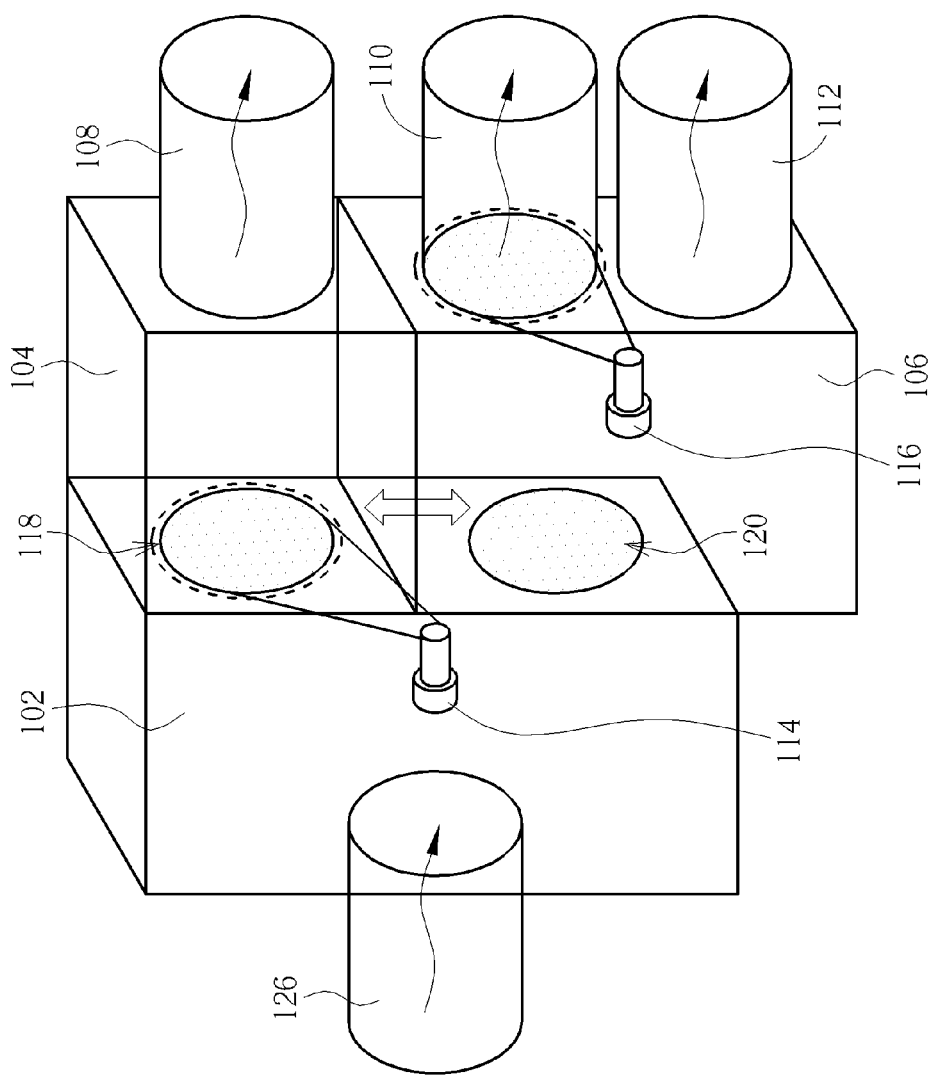
FIG. 1 illustrates a schematic view of a convention exhaust machine.
Figure 2:
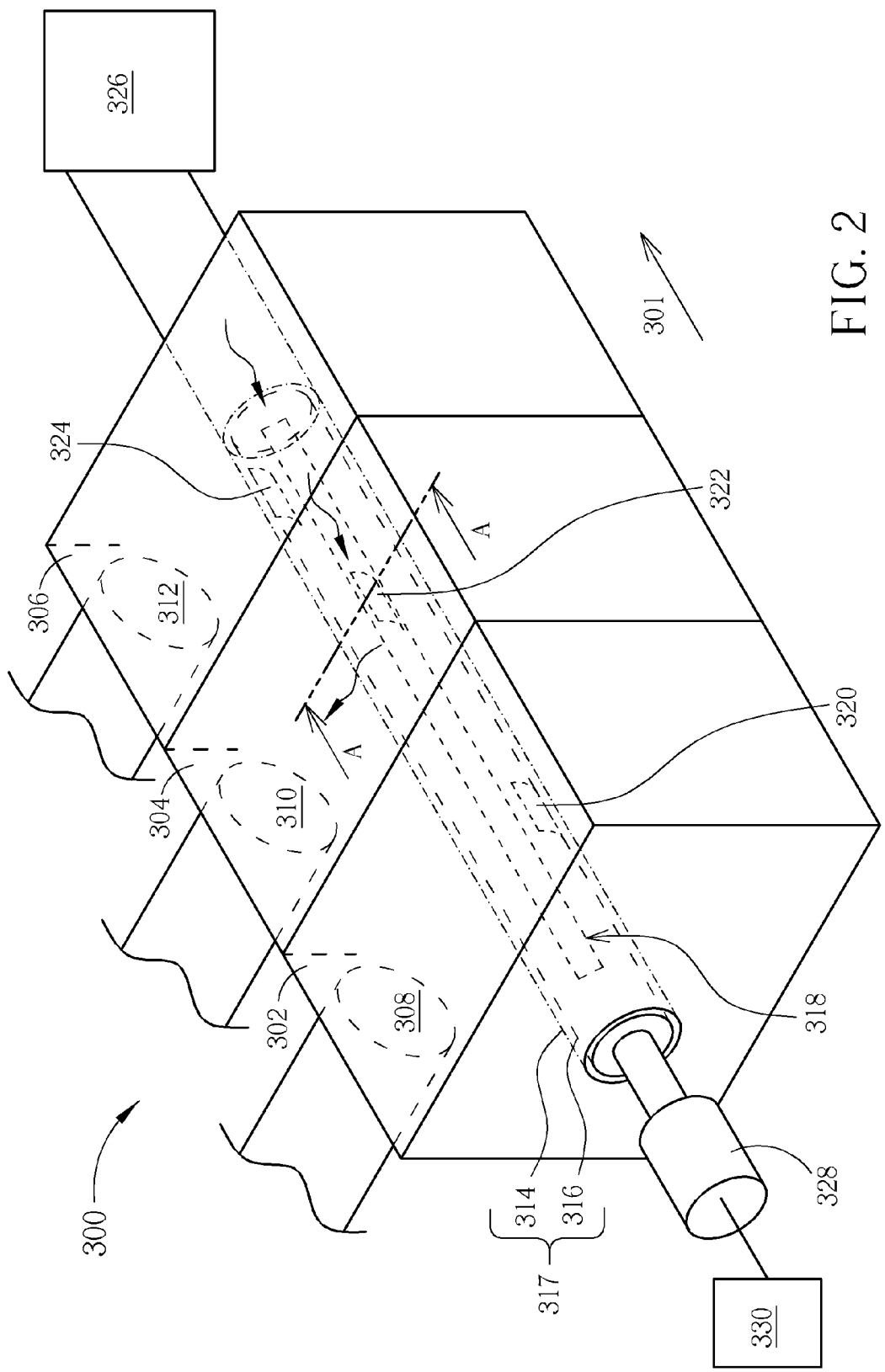
FIG. 2 illustrates a schematic view of an exhaust machine in a first embodiment of the present invention.

Please refer to FIG. 2 which illustrates the schematic view of an exhaust machine in accordance with a first embodiment of the present invention. As shown in FIG. 2, the exhaust machine 300 of the present invention includes a first enclosed chamber 302, a second enclosed chamber 304 and a third enclosed chamber 306. The three enclosed chambers may or may not be adjacent to each other. Preferably, the three enclosed chambers are arranged in a first direction 301. In the present invention, the first enclosed chamber 302 is connected to a first exhaust pipe 308, the second enclosed chamber 304 is connected to a second exhaust pipe 310, and the third enclosed chamber 306 is connected to a third exhaust pipe 312. The three exhaust pipes may provide the pumping force to the connected enclosed chamber respectively in order to pump out the air in the enclosed chambers. In one embodiment of the present invention, the other end of the first exhaust pipe 308, the second exhaust pipe 310 and the third exhaust pipe 312 are connected respectively to different exhaust recycling devices. For example, the first exhaust pipe 308 may be connected to an alkali exhaust recycling device for treating the alkali gas such as $NH_4OH$. The second exhaust pipe 310 may be connected to an organic exhaust recycling device for treating the organic gas such as isopropyl alcohol (IPA), acetone, or propylene glycol monomethyl ether (PGME). The third exhaust pipe 312 may be connected to an acidic exhaust recycling device for treating the acidic gas such as hydrochloric acid (HCl), sulfuric acid ($H_3PO_4$), etc. The exhaust emitted from the first, second, and third exhaust pipes are not limited thereto. For example, the first exhaust pipe 308 may emit organic exhaust, the second exhaust pipe 310 may emit acidic exhaust, and the third exhaust pipe 312 may emit alkaline exhaust. In consideration of the acidic exhaust and alkaline exhaust not being adjacent to each other, it is preferable to separate the exhaust pipe for emitting acidic exhaust and the exhaust pipe for emitting alkaline exhaust by other exhaust pipes.

One main feature of the exhaust machine 300 in the present invention is an extraction tube 317 penetrating through the first enclosed chamber 302, the second enclosed chamber 304, and the third enclosed chamber 306. One end of the extraction tube 317 is connected to an exhaust source 326 such as a reaction chamber of a semiconductor equipment, while the other end of the extraction tube 317 is connected to a pump 328. The extraction tube 317 includes an outer tube 314 and an inner tube 316. The outer tube 314 is provided with a long narrow opening extending and being exposed to the first enclosed chamber 302, the second enclosed chamber 304 and the third enclosed chamber 306. The inner tube 316 disposed inside the outer tube 314 is provided with a first inner opening 320, a second inner opening 322, and a third inner opening 324 corresponding respectively to the first enclosed chamber 302, the second enclosed chamber 304, and the third enclosed chamber 306. One end of the inner tube 316 is connected to pump 328. The pump 328 may drive the inner tube 316 to rotate in the first direction 301 such that only one of the first inner opening 320, the second inner opening 322 and the third inner opening 324 is aligned with the outer opening 318.

Figure 3:
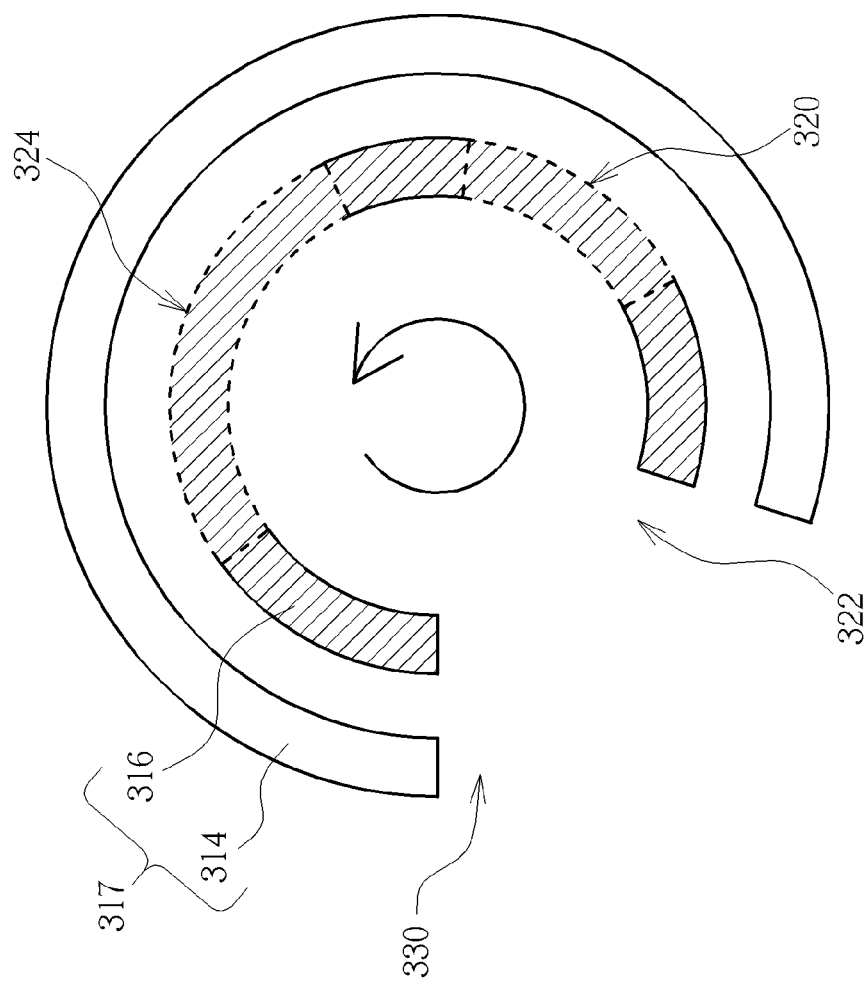
FIG. 3 illustrates a schematic cross-sectional view of an extraction in the present invention.

Please refer now to FIG. 3 which illustrates the cross-sectional view of the extraction tube in the present invention taken along the line A-A in FIG. 2. As shown in FIG. 3, the first inner opening 320, the second inner opening 322, and the third inner opening are oriented at different angles rather than overlapping with each other while seen from the first direction 301. As shown in FIG. 3, please also refer to FIG. 2, a control component 330 will instruct the pump 328 to rotate the inner tube 316 of the extraction tube 317 as the exhaust is produced from the exhaust source 326. The inner tube 316 of the extraction tube 317 is rotated by the pump 328 such that the second inner opening 322 of the inner tube 316 is aligned with the outer opening 318 of the outer tube 316 while the first inner opening 320 and the third inner opening 322 are not aligned with the outer opening 318. In this way, the organic exhaust produced from the exhaust source 326 will enter the second enclosed chamber 304 via the second inner opening 322 and the outer opening 318, and then be emitted from the second exhaust pipe 310. Similarly, if acidic exhaust is produced from the exhaust source 326, the third inner opening 324 will be rotated to align with the outer opening 318 for allowing the acidic exhaust to enter the third enclosed chamber 306 and the third exhaust pipe 312 and then be emitted therefrom.

Figure 4:
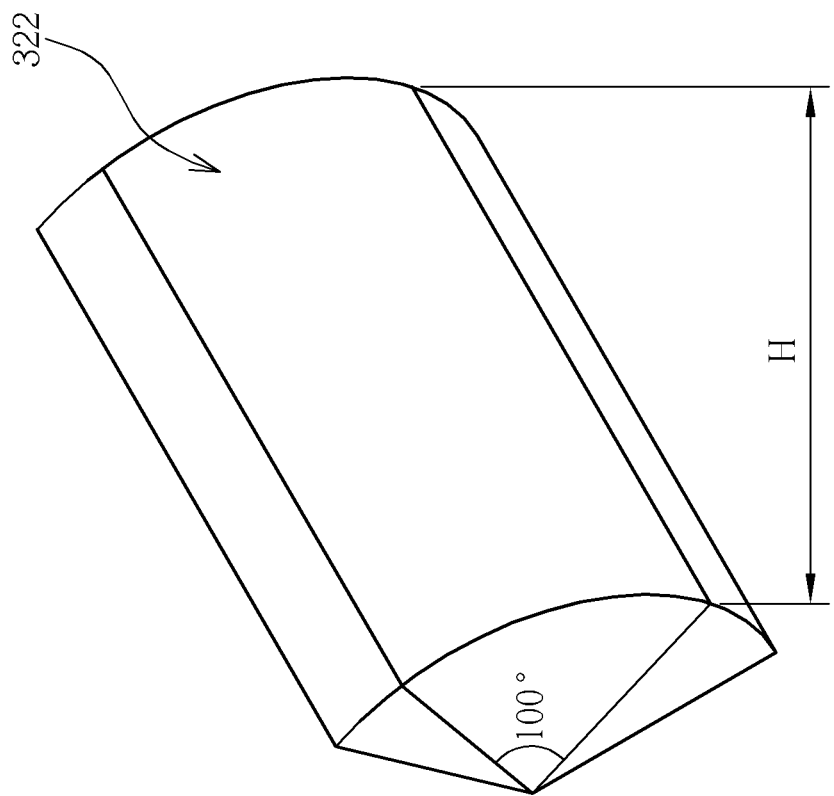
FIG. 4 illustrates a schematic view of the inner openings in the present invention.

Please refer to FIG. 4 which illustrates a schematic view of the inner opening in the present invention. The sizes of the first inner opening 320, the second inner opening 322, and the third inner opening 324 must be adequately dimensioned to provide best exhaust efficiency. In a preferred embodiment of the present invention, take the second inner opening 322 as example, the height H of the second inner opening 322 is generally ranging from 100 mm to 155 mm, preferably 130 mm, while the surface area of the opening is generally ranging from 15000 mm$^2$ to 20000 mm$^2$, preferably 17500 mm$^2$. The included angle defined by the second inner opening 322 and the center of inner tube 316 is generally ranging from 90° to 110°, preferably 100°. Moreover, the extraction pressure of the first exhaust pipe 308, the second exhaust pipe 310, and the third exhaust pipe 312 is about −400 Pa, while the extraction speed is about 305 m$^2$/min.

Figure 5:
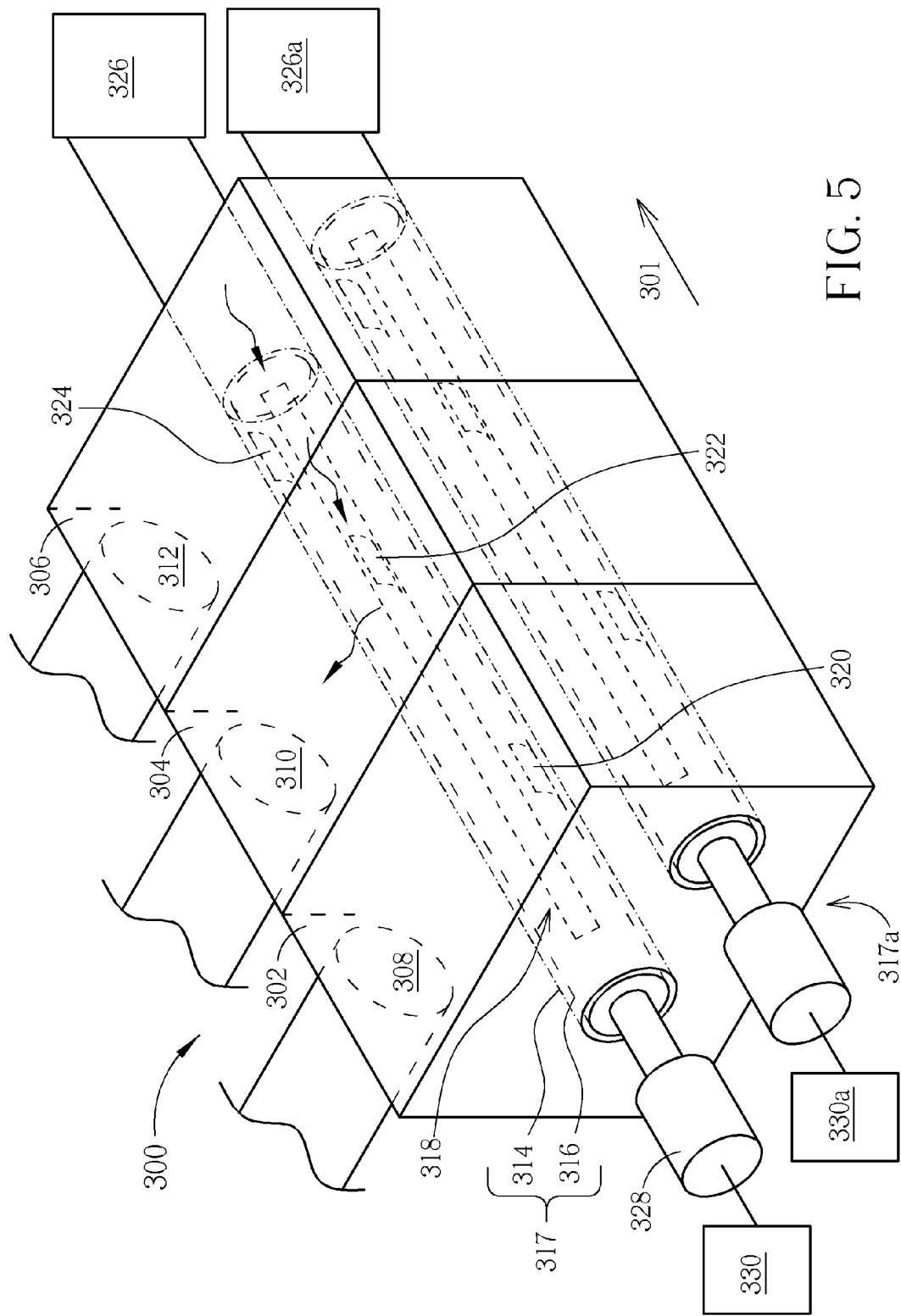
FIG. 5 illustrates a schematic view of an exhaust machine in a second embodiment of the present invention.

Please note that the exhaust machine 300 of the present invention is not limited to three enclosed chambers or one extraction tube. The numbers of the components may be modified depending on the requirements of products. For example, two kinds of exhaust will need two enclosed chambers to be emitted therefrom. Alternatively, please refer to FIG. 5 which illustrates the schematic view of the exhaust machine in accordance with a second embodiment of the present invention, the exhaust machine 300 may be additionally provided with another extraction tube 317a which is connected to another exhaust source 326a and is penetrating through the first enclosed chamber 302, the second enclosed chamber 304, and the third enclosed chamber 306. The embodiment of extraction tube 317a is generally the same as the one of extraction tube 317, thus the details of extraction tube 317a is omitted herein for the simplicity of description. When the exhaust is produced from the exhaust source 326a, the exhaust may be emitted into the first enclosed chamber 302, the second enclosed chamber 304, or the third enclosed chamber 306 via the extraction tube 317a in a similar manner. The exhaust machine 300 of the present invention can extract simultaneously the different exhausts produced from the exhaust source 326 and the exhaust source 326a without interfering with each other, thereby significantly enhancing the efficiency and practicability of the exhaust machine.

In conclusion, the exhaust machine provided by present invention has the features of a particular extraction tube and the opening formed thereon. The different exhausts may be diverged and emitted to different exhaust pipes by a pump. The advantages of the present invention are smaller volume and being less prone to malfunctioning.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A exhaust machine, comprising:
 a first exhaust pipe connected to a first enclosed chamber;
 a second exhaust pipe connected to a second enclosed chamber;
 a extraction tube penetrating through the first enclosed chamber and the second enclosed chamber, the extraction tube being connected to an exhaust source and being provided with a first inner opening and a second inner opening; and
 a pump connected to the extraction tube, the pump driving the extraction tube such that the exhaust produced from the exhaust source enters the first enclosed chamber via the first opening or enters the second enclosed chamber via the second opening.
2. The exhaust machine of claim 1, wherein the extraction tube further comprises an inner tube and an outer tube.
3. The exhaust machine of claim 2, wherein the pump rotates the inner tube of the extraction tube.
4. The exhaust machine of claim 2, wherein the outer tube is provided with an outer opening being exposed to the first enclosed chamber and the second enclosed chamber.
5. The exhaust machine of claim 4, wherein the first inner opening and the second inner opening are formed on the inner tube.
6. The exhaust machine of claim 5, wherein the first opening is aligned with the outer opening and a pumping force is provided by the first exhaust pipe when the exhaust source produces a first gas.
7. The exhaust machine of claim 6, wherein the second opening is not aligned with the outer opening when the exhaust source produces the first gas.
8. The exhaust machine of claim 5, wherein the second opening is aligned with the outer opening and a pumping force is provided by the second exhaust pipe when the exhaust source produces a second gas.
9. The exhaust machine of claim 8, wherein the first opening is not aligned with the outer opening when the exhaust source produces the second gas.

* * * * *